H. B. BABSON.
PULSATOR FOR MILKING MACHINES.
APPLICATION FILED NOV. 9, 1918.

1,335,953.

Patented Apr. 6, 1920.
2 SHEETS—SHEET 1.

Inventor:
Henry B. Babson.
By Cheever & Cox
Attys.

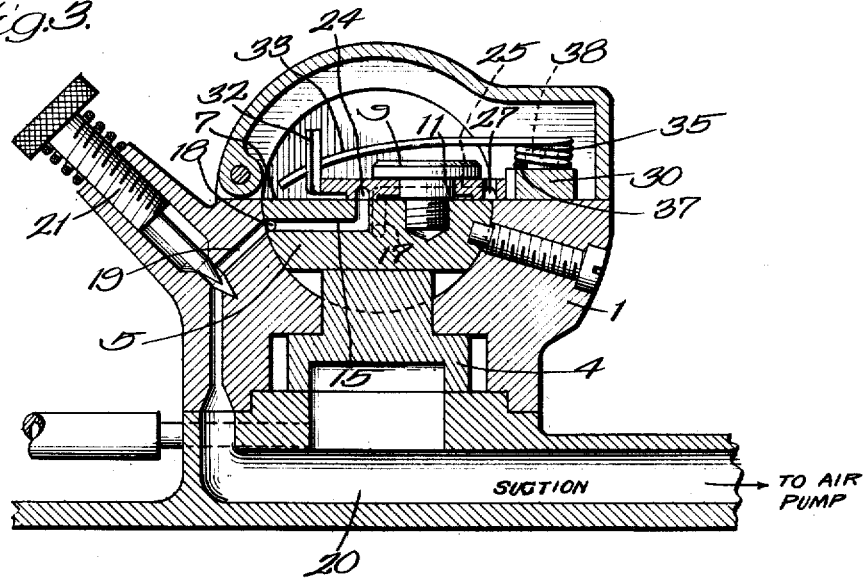
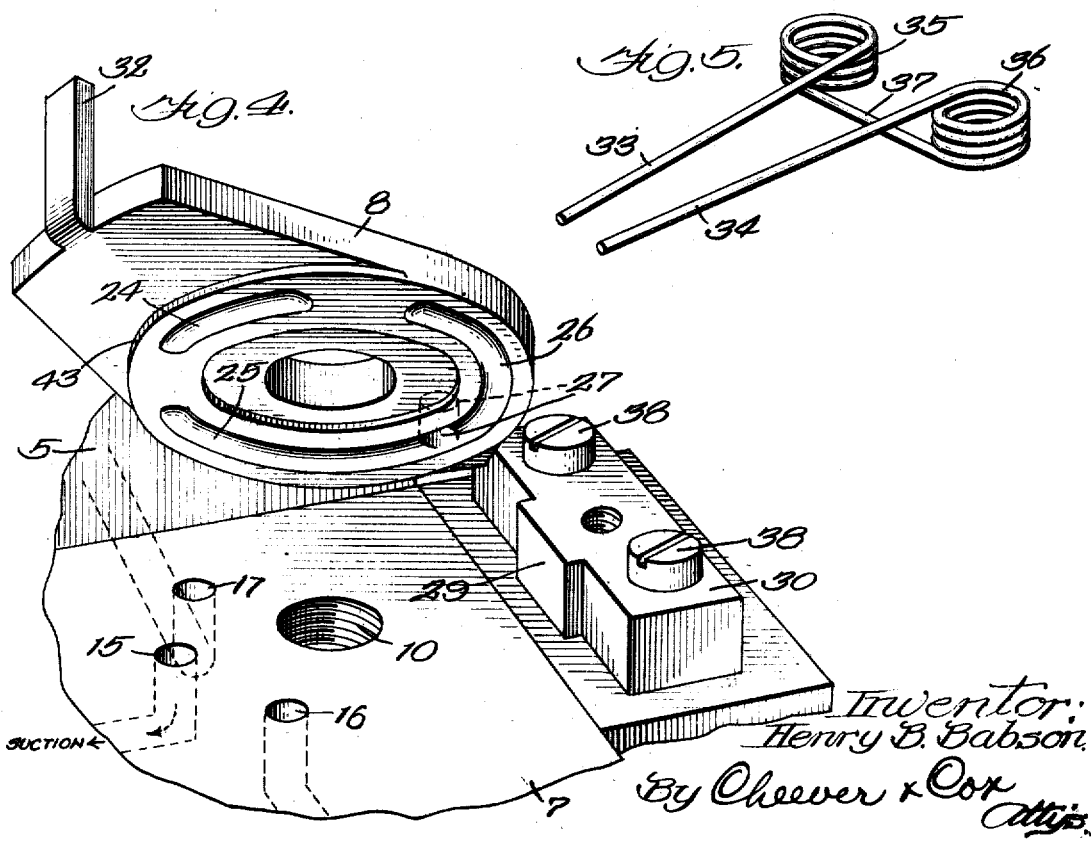

UNITED STATES PATENT OFFICE.

HENRY B. BABSON, OF CHICAGO, ILLINOIS, ASSIGNOR TO PINE TREE MILKING MACHINE COMPANY, OF CHICAGO, ILLINOIS, A CORPORATION OF ILLINOIS.

PULSATOR FOR MILKING-MACHINES.

1,335,953.  Specification of Letters Patent.  Patented Apr. 6, 1920.

Application filed November 9, 1918. Serial No. 261,788.

*To all whom it may concern:*

Be it known that I, HENRY B. BABSON, a citizen of the United States, residing at Chicago, in the county of Cook and State of Illinois, have invented a certain new and useful Improvement in Pulsators for Milking-Machines, of which the following is a specification.

My invention relates to pulsators for milking machines and the object of the invention is to improve the valve mechanism in the general type of pulsators shown in the patent to Macartney, Number 1,266,697. As the milk pails have to be carried about by hand it is desirable that the pulsator mechanism shall be as compact and light as possible. With this in view, one of the problems is to make a small and simple form of reversing valve mechanism and at the same time prevent leakage at the valve. Cylindrical valves and plunger valves have been employed but these have the disadvantage of occupying considerable space. Plate valves have also been employed, but difficulty has been experienced in keeping them closely seated. The amounts of air handled in the valve mechanism are small and a slight tilting of a valve of the flat or plate type will cause an excessive percentage of leakage. To avoid this, it has been proposed to make a valve holder separate from the valve, for operating it. This type is shown for example in Warnock Patent 1,270,473. But this calls for extra machine work of a rather fine character and places the pivot at a point remote from the valve center. Furthermore, in the case of the Warnock structure a spring is required for holding the valve close to its seat. The object of my present invention is to make it possible and practicable to dispense with the separate holder and to so construct the device that the reversing valve will be held close to its seat by suction. In Burrell Patent 784,780 a flat reversing valve is shown, but the suction force is applied entirely at one side of the axis, thus tending to cause unequal wear and a tilting of the valve. One of the objects of the present invention is to avoid this, and equalize the wear on the valve. Another object is to improve the valve action, especially with respect to the spring which furnishes the force for reversing the valve.

I obtain my objects by the mechanism illustrated in the accompanying drawings, in which Figure 1 is a top plan view of the valve and spring mechanism showing the same in association with the other parts of the pulsator. The cylinder is shown in horizontal axial section.

Fig. 3 is a transverse sectional elevation on the line 3—3, Fig. 1.

Fig. 4 is a perspective view of the valve seat and associate mechanism showing the relationship of the parts and passages.

Fig. 5 is a perspective view of the reversing spring.

Similar numerals refer to similar parts throughout the several views.

Figure 1:
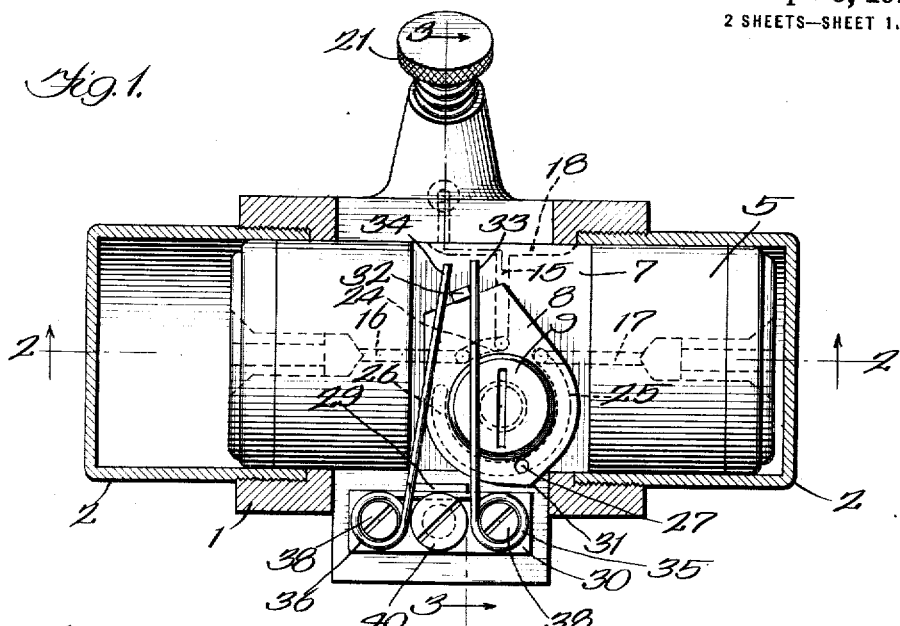
Figure 2:
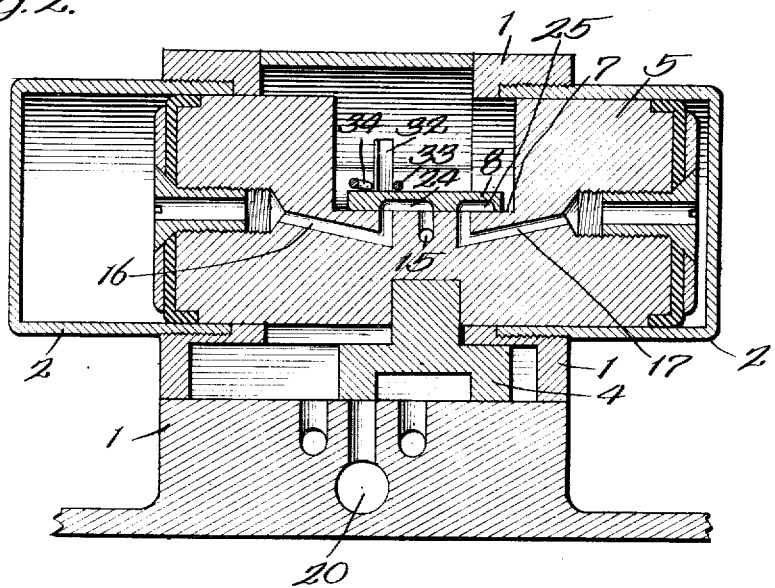
Fig. 2 is a vertical sectional view on the line 2—2, Fig. 1.

As the general principles of pulsators of this type are well known, the principal elements need not be here described in great detail. In the device selected to illustrate the invention, the body 1 supports cylinders 2 and forms a guide for the main pulsator valve 4. The function of the piston 5 which works in the cylinders is to actuate said valve in the well known manner. A flat surface 7 is formed within the piston and constitutes a seat for the reversing valve 8. Said valve is held centered by a cap screw 9, the head whereof overlies the valve. The threaded lower end of the screw screws into a suitably threaded aperture 10 in the valve seat and a shoulder 11 formed on the screw prevents the screw from descending far enough to bind the valve. Terminating at the valve seat are three passages 15, 16 and 17. The passages 16 and 17 lead through the piston to the ends of the cylinder and for identification will be referred to as "air ducts." The passage 15 which for identification will be termed the "suction duct" connects with the duct 18 formed in the piston. This is elongated so that it may remain in constant communication with a passage 19 for all positions of the piston. The passage 19 is formed in the body 1 and communicates with a passage 20 leading to the air pump (not shown). A reducing valve 21 screws into the body in such position as to regulate the flow through passage 19.

The reversing valve 8 has three concentric grooves formed in its inner face. The groove 24 which for identification will be termed the "suction groove" is so formed that in one position of the valve it will connect duct 15 with duct 16 and in the reverse position will connect duct 15 with duct 17. The exhaust grooves 25 and 26 are on the opposite side of the axis and are here shown as communicating with each other as well as with an atmospheric port 27 which in the present case extends vertically through the valve. Said exhaust grooves are so formed that when groove 24 connects duct 15 with duct 16, the groove 25 will connect duct 17 with the atmosphere through the exhaust port 27. In the reverse position of the valve the duct 16 will be connected with the atmosphere by way of the groove 26 and the duct 15 will be connected with the duct 17.

In general the operating mechanism for the reversing valve is analogous to the one described in said Macartney patent. A shoe 29 is formed upon a stationary block 30 at the side of the valve seat in position to be engaged by an arm 31 formed at one edge of the valve. A finger 32 rises from the valve between two spring arms 33, 34. These extend from coils 35, 36 respectively which are connected by a bar 37. In practice the spring arms, the coils and the connecting bar are made of a single piece of spring wire. The coils are held against lateral movement by two studs or posts 38 screwing into said block 30. A screw 40 screws into block 30 in such position that its head overlies bar 37 and holds it down in position. Thus the finger 32 lies between the two resilient arms 33, 34 which normally extend substantially transverse to the piston. The result is that as the piston travels from one end of the cylinder to the other, carrying the reversing valve with it, the springs will hold the arm 31 in contact with shoe 29 until it has passed the end of the shoe, after which they will quickly reverse the position of the valve. The reversal of the valve will reverse the travel of the air in the passages above described, and will reverse the motion of the piston in the well known manner. There are several advantages in this type of spring mechanism. In the first place, only one of the arms is flexed at a time thus dividing the work between them. In the second place the springs are easy to attach and detach and become secure in their position. By preference the free ends curve down to a point near the surface of the valve where they engage the finger 32, thus placing the rotational effect at or near the plane of the valve and relieving the tendency to tilt the valve upon its seat.

It will be noted especially by reference to Fig. 4 that the under surface of the valve is not all in the same plane. A ring 43 is formed on the under side concentric with the axis of the plate and preferably having a diameter but slightly greater than the outer diameter of the groove 24, 25, 26. This assists in tending to equalize the friction on the valve seat. A study of the action of the valve plate and of the air pressure upon it will show that not only is the valve held to its seat by suction, but that the suction is distributed quite uniformly around the circumference of the bearing surface thereof. It will be understood that the suction duct 15 is always under vacuum when the machine is in operation. The suction groove 24 is always in communication with said duct and hence there is a suction effect throughout the length of said groove. But it will also be noted that the exhaust grooves 25, 26 are also under suction most, if not all, of the time, during the operation of the machine. It is true that these grooves communicate with the atmosphere but they are more or less restricted in cross section and hence afford frictional resistance to the flow of air through them and they are also of considerable length, the aggregate length in the particular case shown being approximately 250° of the entire circumference. It must be remembered that at the inner end, the exhaust grooves connect with the end of the cylinder from which the air has been exhausted. In view of this and the length of the exhaust grooves the atmospheric pressure on the top of the valve is abundantly sufficient to prevent leakage. This fact, taken in connection with the fact that in practice a lubricant is constantly maintained in place between the valve and the seat, and the fact that the contact surface is annular, effectually prevents leakage at all times and by equalizing the wear also greatly extends the life of the valve. While there is an advantage in giving the wearing surface or seat 43 a circular periphery, there is an added advantage in making it annular—that is, with a circular inner edge as well as a circular outer edge. The amount of wear is in proportion to the distance traveled, and in an oscillating piece like the valve the outer portions travel farther than the inner portions. This tends to create a greater amount of wear near the circumference than near the center, and hence the tendency is for the valve to become thinner toward the edges while not wearing down so fast toward the center. This tends finally to produce leakage. With my construction I have removed the center portion and left merely an annular seat on the valve and hence the amount of wear is much more nearly uniform over the entire contacting surface. Furthermore, by having the wearing surface circular, there is no tendency to form a shoulder at any point on the supporting surface. An arm, or an irregular oscillating piece, rubbing on a surface tends to form a shoulder at the stopping point, where the reverse movement begins. With a circular contacting surface, as in my valve, this is avoided.

Having thus described my invention, what I claim as new and desire to secure by Letters Patent, is:—

1. A pulsator for milking machines having a cylinder, a piston working therein, means controlled by the piston for varying the pressure on the teat cups, one of said first two elements being provided with air ducts leading to opposite ends of the cylinder for conveying the motive air to and from said ends, and with a suction duct, and a valve seat at which said ducts terminate, a valve on said seat for controlling the flow of motive air to and from said ducts, and means for operating said valve, said valve having air passages for connecting the air ducts alternately with the suction duct and with the atmosphere, a portion of said passages extending along and being sunk in the inner face of the valve for holding it closely to its seat.

2. A pulsator for milking machines having a cylinder, a piston working therein, means controlled by the piston for varying the pressure on the teat cups, the piston having air ducts leading to opposite ends of the cylinder for conveying the motive air to and from said ends, the piston also having a suction duct, a valve seat at which said ducts terminate, an oscillatory, rotary plate valve on said seat for controlling the flow of motive air to and from said ducts, and means for oscillating said valve, said valve having air passages for connecting the air ducts alternately with the suction duct and with the atmosphere, a portion of said passages extending along and being sunk in the inner face of the valve for holding it closely to its seat.

3. A pulsator for milking machines having a cylinder, a piston working in said cylinder, means actuated by said piston for varying the pressure on the teat cups, one of said first two elements being provided with a valve seat, a suction duct, and air ducts leading to the opposite ends of the cylinder, all of said ducts terminating at said valve seat, and a valve plate on said seat adapted to oscillate upon an axis perpendicular to said plate, said plate having grooves in its inner surface, one groove being adapted to connect the suction duct first with one air duct and then with the other and the other of said grooves being adapted to connect the temporarily disconnected air duct with the atmosphere.

4. A pulsator for milking machines having a cylinder, a piston working in said cylinder, means actuated by said piston for varying the pressure on the teat cups, one of said first two elements being provided with a valve seat, a suction duct, and air ducts leading to the opposite ends of the cylinder, each of said ducts having one terminus at said valve seat, and a valve plate adapted to oscillate upon an axis perpendicular to said plate, said plate having a suction groove formed in its inner face concentric with said axis, said suction groove being adapted to connect the suction duct first with one air duct and then with the other, the plate also having exhaust grooves formed in its inner face concentric with said axis for connecting said air ducts with the atmosphere alternately, said grooves being arranged symmetrically, circumferentially, for balancing the effect of the atmospheric pressure on the outer face of the valve.

5. A pulsator for milking machines having a cylinder, a piston reciprocating therein, means actuated by said piston for varying the pressure on the teat cups, one of said first two elements being provided with a valve seat, a suction duct, and air ducts leading to the opposite ends of the cylinder, all of said ducts having one terminus at said valve seat, a valve plate adapted to oscillate upon an axis perpendicular to the plate, said plate having a suction groove in its inner face concentric with said axis and adapted to connect the suction duct first with one air duct and then with the other, the plate also having exhaust grooves in its inner face concentric with said axis, and arranged oppositely to said suction groove, said exhaust grooves communicating with the atmosphere at a point substantially diametrically opposite to the middle of the suction groove, and extending circumferentially about two thirds of a circumference, said exhaust grooves being adapted to put the temporarily disconnected air duct in communication with the atmosphere.

6. A pulsator for milking machines having a cylinder, a piston reciprocating therein, means actuated by said piston for varying the pressure on the teat cups, said piston being provided with a valve seat, a suction duct, and air ducts, said air ducts leading to the opposite ends of the cylinder, all of said ducts having one terminus at said valve seat, a valve plate seating upon said valve seat and adapted to oscillate upon an axis perpendicular to the plate, said plate having a suction groove in its inner face concentric with said axis and adapted to connect the suction duct first with one air duct and then with the other, the plate also having exhaust grooves in its inner face concentric with said axis, and arranged oppositely to said suction groove, said exhaust grooves communicating with the atmosphere at a point substantially diametrically opposite to the middle of the suction groove and extending circumferentially about two thirds of a circumference, said exhaust grooves being adapted to put the temporarily disconnected air duct in communication with the atmosphere.

7. A pulsator for milking machines having a cylinder, a piston, a reversing valve plate, one of said first two elements being provided with a valve seat, a suction duct, and air ducts communicating with the opposite ends of the cylinder, and means for oscillating the valve plate, all of said ducts having one terminus in said valve seat, the reversing plate rotating upon an axis perpendicular to the plate and having grooves in its under face for holding it closely seated, said grooves being centered at the axis, and one of them forming an exhaust groove for connecting the suction duct with the air ducts alternately, the other grooves constituting exhaust grooves, one end of which is open to the atmosphere, and the other end communicates with the disconnected air duct when the suction groove connects the suction duct with the other air duct, the aggregate length of the exhaust grooves being greater than the length of the suction groove.

8. A pulsator for milking machines having a cylinder, a piston, a reversing valve plate, one of said first two elements being provided with a valve seat, a suction duct, and air ducts communicating with the opposite ends of the cylinder, and means for oscillating the valve plate, all of said ducts having one terminus in said valve seat, the reversing plate rotating upon an axis perpendicular to the plate, and having grooves in its under face for holding it closely seated, said grooves being centered at the axis, and one of them forming an exhaust groove for connecting the suction duct with the air ducts alternately, the other grooves constituting exhaust grooves, one end of which is open to the atmosphere and the other end communicates with the disconnected air duct when the suction groove connects the suction duct with the other air duct, the suction groove and the exhaust grooves being symmetrically located on opposite sides of the axis, the bearing surface of said plate being circular and concentric with said axis.

9. A pulsator for milking machines having a cylinder, a piston, a reversing valve plate, one of said first two elements being provided with a valve seat, a suction duct, and air ducts communicating with the opposite ends of the cylinder, and means for oscillating the valve plate, all of said ducts having one terminus in said valve seat, the reversing plate rotating upon an axis perpendicular to the plate, and having grooves in its under face for holding it closely seated, said grooves being centered at the axis, and one of them forming an exhaust groove for connecting the suction duct with the air ducts alternately, the other grooves constituting exhaust grooves, one end of which is open to the atmosphere and the other end communicates with the disconnected air duct when the suction groove connects the suction duct with the other air duct, the suction and exhaust grooves being symmetrically located on opposite sides of the axis and the aggregate length of the exhaust grooves being at least 180°, and the reversing valve plate having a circular bearing surface concentric with the axis and of a diameter slightly greater than the outer diameter of said grooves.

10. A pulsator for milking machines having a cylinder, a piston provided with suitable air ducts for causing the piston to reciprocate, a stationary shoe, a reversing valve for controlling said air ducts, said valve being mounted upon the piston and having an arm traveling along and beyond the ends of the shoe for temporarily holding and then suddenly releasing the valve, and two springs having a stationary support and free ends adapted to engage the reversing valve, one of said springs being adapted to press the valve in one direction and the other in the other direction.

11. A pulsator for milking machines having a cylinder, a piston provided with suitable air ducts for causing the piston to reciprocate, a stationary shoe, a reversing valve for controlling said air ducts, said valve being mounted upon the piston and having an arm traveling along and beyond the ends of said shoe for temporarily holding and then suddenly releasing the valve, and two springs having a stationary support and free ends adapted to engage the reversing valve, one of said springs being adapted to press the valve in one direction and the other in the other direction, said springs being united at their stationary ends, whereby they may be replaced or removed as a unit.

12. In a pulsator for milking machines, a stationary cylinder, a piston traveling therein and provided with suitable air ducts for causing the piston to reciprocate, a reversing valve mounted on the piston for controlling said ducts, a stationary shoe coöperating with said reversing valve for first holding it and then releasing it, and a duplex spring for actuating said valve, said spring having two resilient arms, a coil for each arm, a bar connecting said coils, and a screw screwing into the cylinder and overlying said bar for removably holding it in place.

13. In a pulsator for milking machines, a stationary cylinder, a piston traveling therein and provided with suitable air ducts for causing the piston to reciprocate, a reversing valve mounted on the piston for controlling said ducts, a stationary shoe coöperating with said reversing valve for first holding it and then releasing it, a duplex spring for actuating said valve, said spring having two resilient arms, a coil for each arm, posts secured to the cylinder and adapted to be surrounded by said coils for holding them in position, and means for preventing said coils from becoming disengaged from said posts.

14. A pulsator for milking machines having a cylinder, a piston working therein, means controlled by the piston for producing the air pulsations, one of said first two elements being provided with air ducts for controlling the movement of said piston, a reversing valve for controlling the flow of air in said ducts, and means for oscillating said valve, the wearing surface of said valve having a circular periphery.

15. A pulsator for milking machines having a cylinder, a piston working therein, means controlled by the piston for producing the air pulsations, one of said first two elements being provided with air ducts for controlling the movement of said piston, a reversing valve for controlling the flow of air in said ducts, and means for oscillating said valve, the wearing surface of said valve being annular, with a circular inner and a circular outer periphery.

16. A pulsator for milking machines having a cylinder, a piston working therein for producing the air pulsations and provided with air ducts for controlling the movement of said piston, a reversing valve mounted for controlling the flow of air in said ducts, said valve being pivotally mounted on the piston, and means for oscillating said valve about its pivot, said means including a spring, a stationary shoe and an arm on said valve coöperating with said shoe, the valve having a wearing surface having a circular periphery practically tangential to the base of said arm.

In witness whereof, I have hereunto subscribed my name.

HENRY B. BABSON.